US012695408B2

(12) United States Patent
    Goto et al.

(10) Patent No.: US 12,695,408 B2
(45) Date of Patent: Jul. 28, 2026

(54) MOTOR CONTROL DEVICE AND ELECTRIC POWER STEERING DEVICE

(71) Applicant: Mitsubishi Electric Corporation, Tokyo (JP)

(72) Inventors: Takashi Goto, Tokyo (JP); Eiji Iwami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 184 days.

(21) Appl. No.: 18/685,394

(22) PCT Filed: Oct. 26, 2021

(86) PCT No.: PCT/JP2021/039390
    § 371 (c)(1),
    (2) Date: Feb. 21, 2024

(87) PCT Pub. No.: WO2023/073792
    PCT Pub. Date: May 4, 2023

(65) Prior Publication Data
    US 2025/0239958 A1      Jul. 24, 2025

(51) Int. Cl.
    *H02P 27/08*      (2006.01)
    *B62D 5/04*       (2006.01)
    *H02P 29/68*      (2016.01)

(52) U.S. Cl.
    CPC ............ *H02P 29/68* (2016.02); *B62D 5/0496* (2013.01)

(58) Field of Classification Search
    CPC ....... H02P 29/68; H02P 29/60; B62D 5/0496; B62D 5/0481; B62D 5/046; B62D 5/0406
    See application file for complete search history.

(56) References Cited

U.S. PATENT DOCUMENTS

| | | | |
|---|---|---|---|
| 6,380,706 B1 | 4/2002 | Kifuku et al. | |
| 2014/0118866 A1* | 5/2014 | Iwami | H02H 7/08 |
| | | | 361/25 |
| 2021/0281204 A1 | 9/2021 | Harada et al. | |

FOREIGN PATENT DOCUMENTS

| | | |
|---|---|---|
| JP | 3605349 B2 | 12/2004 |
| JP | 4064600 B2 | 3/2008 |

(Continued)

OTHER PUBLICATIONS

Office Action issued Jun. 25, 2024 in Japanese Application No. 2023-555917.

(Continued)

*Primary Examiner* — Muhammad S Islam
(74) *Attorney, Agent, or Firm* — Sughrue Mion, PLLC

(57) ABSTRACT

A motor control device includes an assistive torque current calculation unit that obtains a current that needs to be supplied to a motor, and an overheat protection limit calculation unit that obtains an overheat protection coefficient when current obtained from the assistive torque calculation unit flows through using an overheat protection feature, and obtains a current actually supplied to the motor using the obtained overheat protection coefficient, wherein the overheat protection feature: shows a relationship between how large the current is, and the overheat protection coefficient, where the current is regulated by taking into account an effect that heat generated by a part out of a plurality of parts disposed on a pathway which the current that is supplied to the motor flows through has on an ambient temperature, and an effect that heat generated by other parts out of the plurality of parts has on the ambient temperature.

7 Claims, 5 Drawing Sheets

(56) References Cited

FOREIGN PATENT DOCUMENTS

| | | | |
|---|---|---|---|
| JP | 2014-091373 | A | 5/2014 |
| JP | 2021-141743 | A | 9/2021 |

OTHER PUBLICATIONS

International Search Report for PCT/JP2021/039390, dated Dec. 14, 2021.

* cited by examiner

FIG. 2

MOTOR CONTROL DEVICE AND ELECTRIC POWER STEERING DEVICE

CROSS REFERENCE TO RELATED APPLICATIONS

This application is a National Stage of International Application No. PCT/JP2021/039390 filed Oct. 26, 2021.

TECHNICAL FIELD

The present disclosure relates to a motor control device and an electric power steering device.

BACKGROUND ART

An electric power steering device has a steering assist torque generating motor, and a motor control device to control the motor, with respect to steering, and adds a steering assist force to a steering mechanism of a vehicle such as an automobile or the like. Since the above electric power steering device generates heat due to a current that flows to the motor control device and to the motor, a countermeasure for heat dissipation is needed.

In a conventional electric power steering device, a countermeasure for heat dissipation of the motor control device is carried out by limiting current flow to the motor control device, according to a value detected by a temperature detection means (for example, a temperature thermistor) provided in the motor control device. Patent Documents 1 and 2 listed below are referred to for details of the above mentioned conventional electric power steering device.

CITATION LIST

Patent Document

[Patent Document 1] Japanese Patent (Granted) Publication No. 4064600
[Patent Document 2] Japanese Patent (Granted) Publication No. 3605349

SUMMARY OF INVENTION

Problem to be Solved by the Invention

When conducting a countermeasure for heat dissipation in a conventional electric power steering device as mentioned above however, a temperature detection means provided in the motor control device is treated as an ambient temperature. Since the temperature detection means provided in the motor control device is not necessarily in close proximity to a part needing a heat dissipation countermeasure, there are cases where a detected temperature and the actual ambient temperature deviate from one another.

For such reason, there is a tendency to heavily prioritize safety in the conventional motor control device, and current flow to a motor is too constrained. Specifically, in the conventional motor control device, when the current flow to the conventional motor is a large current, limiting the current too hastily and intermittently afterwards is linked to problems of decrease in a steering assist force.

The present disclosure has been made in order to address the problem above, and an object is to provide a motor control device and an electric power steering device where it is possible to prevent a decrease in the steering assist force while conducting a suitable countermeasure for heat dissipation.

Means to Solve the Problem

To solve the above problem, a motor control device according to an embodiment of the present disclosure includes: a first calculation unit that obtains a current that needs to be supplied to a motor, and a second calculation unit that obtains an overheat protection coefficient when current obtained from the first calculation unit flows through using an overheat protection feature, and obtains a current that is actually supplied to the motor using the obtained overheat protection coefficient, wherein the overheat protection feature: shows a relationship between how large the current is, and the overheat protection coefficient, where the current is regulated by taking into account an effect that heat generated by a part out of a plurality of parts disposed on a pathway which the current that is supplied to the motor flows through has on an ambient temperature, and an effect that heat generated by other parts out of the plurality of parts has on the ambient temperature.

An electric power steering device according to an embodiment of the present disclosure may include: a torque sensor that detects a steering torque of steering, the motor which generates steering assist torque with respect to the steering, and the motor control device mentioned above that controls the drive unit of the motor.

Effects of the Invention

According to the present disclosure, it is possible to prevent a decrease in a steering assist force while conducting a suitable countermeasure for heat dissipation.

BRIEF DESCRIPTION OF DRAWINGS

FIG. 2 A block diagram that shows a configuration that relates to an overheat protection that a CPU conducts in the first embodiment.

DESCRIPTION OF EMBODIMENTS

Hereinafter, a motor control device and an electric power steering device according to embodiments of the present disclosure are explained with reference to the drawings.

First Embodiment

<Electric Power Steering Device>

Figure 1:
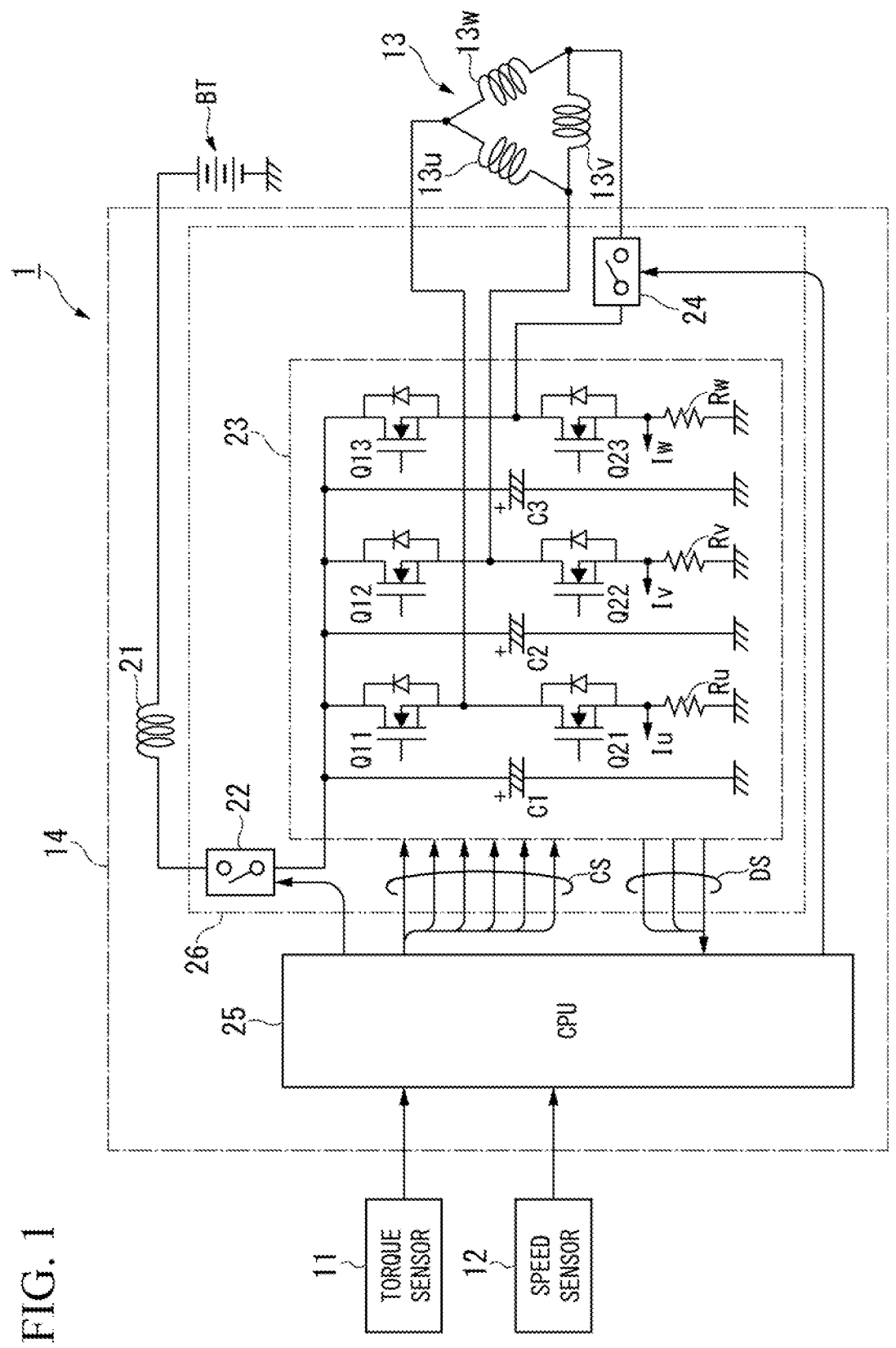
FIG. 1 A block diagram that shows an overall structure of an electric power steering device according to a first embodiment.

FIG. 1 is a block diagram that shows an overall structure of an electric power steering device. As shown in FIG. 1, an electric power steering device 1 according to a present embodiment includes a torque sensor 11, a vehicle speed sensor 12, a motor 13, and a control unit 14 (motor control device), and adds a steering assist force to a steering mechanism of a vehicle such as an automobile or the like.

The torque sensor 11 is disposed in the proximity of a vehicle steering (steering wheel), and detects a steering torque of a vehicle driver. The vehicle speed sensor 12 detects a speed of a vehicle. The motor 13 is mounted on a vehicle steering column and a rack shaft, and generates a steering assist torque with respect to the vehicle steering while under control of a control unit 14. It is possible adopt a three phase brushless motor having for example a U phase coil 13$u$, a V phase coil 13$v$, and a W phase coil 13$w$ as the motor 13.

The control unit 14 controls the steering assist force added to the steering mechanism of the vehicle by controlling a current that is supplied to the motor 13, according to detection results of the torque sensor 11 and the vehicle speed sensor 12. A current supply source with respect to the motor 13 is a vehicle battery BT. The control unit 14 includes a choke coil 21, a power relay 22, a drive unit 23, a relay 24, a CPU (Central Processing Unit) 25, and a heatsink 26. Hereinafter, to distinguish between the power relay 22 and the relay 24, the relay 24 shall be referred to as a "motor relay 24".

In order to cancel noise, the choke coil 21 is provided between the battery BT and the power relay 22. The power relay 22 is provided between the choke coil 21 and the drive unit 23, and is in an open state or a closed state by being under the control of the CPU 25. The power relay 22 is for example, provided so as to cut off the current being supplied from the battery BT to the motor 13 in case an abnormality occurs.

The drive unit 23 is provided between the power relay 22 and the motor 13, and drives the motor 13 by supplying an alternating current to the motor 13, and under the control of the CPU 25, the alternating current is generated by the drive unit 23 from a direct current supplied by the battery BT. The drive unit 23 includes positive electrode side drive elements Q11, Q12, and Q13, negative electrode side drive elements Q21, Q22, and Q23, smoothing capacitors C1, C2 and C3, and shunt resistors Ru, Rv, and Rw.

The positive electrode side drive elements Q11, Q12, and Q13 are connected to a positive electrode of the battery BT via the power relay 22 and the choke coil 21. The negative electrode side drive elements Q21, Q22, and Q23 are connected to each of the positive electrode side drive elements Q11, Q12, and Q13, and are connected to a negative electrode of the battery BT via each of the shunt resistors Ru, Rv, and Rw.

A U phase series circuit is formed of a positive side drive element Q11, a negative side drive element Q21, and a shunt resistor Ru. A connection point of the positive side drive element Q11 and the negative side drive element Q21 is connected to the connection point of the U phase coil 13$u$ and the W phase coil 13$w$ of the motor 13 in the U phase series circuit.

A V phase series circuit is formed of a positive side drive element Q12, a negative side drive element Q22, and a shunt resistor Rv. The connection point of the positive side drive element Q12 and the negative side drive element Q22 is connected to the connection point of the U phase coil 13$u$ and the V phase coil 13$v$ of the motor 13 in the V phase series circuit.

A W phase series circuit is formed of a positive side drive element Q13, a negative side drive element Q23, and a shunt resistor Rw. The connection point of the positive side drive element Q13 and the negative side drive element Q23 is connected to the connection point of the V phase coil 13$v$ and the W phase coil 13$w$ of the motor 13 via the motor relay 24 in the W phase series circuit.

It is possible to use semiconductor switching elements such as MOSFETs (Metal-Oxide-Semiconductor Field Transistors) or the like as the positive electrode side drive elements Q11, Q12, and Q13 and the negative electrode side drive elements Q21, Q22, and Q23. A control signal CS is provided from an output of the CPU 25 to gate terminals of the positive electrode side drive elements Q11, Q12, and Q13 and gate terminals of the negative electrode side drive elements Q21, Q22, and Q23. The positive electrode side drive elements Q11, Q12, and Q13 and the negative electrode side drive elements Q21, Q22, and Q23 are attached to the heatsink 26 for overheat protection.

The positive electrode side drive elements Q11, Q12, and Q13 and the negative electrode side drive elements Q21, Q22, and Q23 are in an ON or an OFF state due to the control signal CS that is output from the CPU 25. In such fashion, the drive unit 23 generates the alternating current supplied to the motor 13 by the direct current being supplied from the battery BT.

The smoothing capacitors C1 to C3 are each provided so as to correspond with the U phase series circuit, the V phase series circuit, and the W phase series circuit. The smoothing capacitors C1 to C3 are each connected to each of the U phase series circuit, the V phase series circuit, and the W phase series circuit in parallel, and each smooth voltages of both ends of each of the U phase series circuit, the V phase series circuit, and the W phase series circuit. Although a configuration where each of the U phase series circuit, the V phase series circuit, and the W phase series circuit has a corresponding smoothing capacitor out of the three smoothing capacitors C1 to C3 as shown in the example of FIG. 1, the configuration may be that where only a single smoothing capacitor is shared by the U phase series circuit, the V phase series circuit, and the W phase series circuit.

The shunt resistor Ru detects a current Iu that flows to the U phase coil 13$u$ of the motor 13. The shunt resistor Rv detects a current Iv that flows to the V phase coil 13$v$ of the motor 13. The shunt resistor Rw detects a current Iw that flows to the W phase coil 13$w$ of the motor 13. Currents Iu, Iv and Iw detected by the shunt resistors Ru, Rv and Rw are input into the CPU 25 as a detected signal DS.

The motor relay 24 is provided between the connection point of the positive side drive element Q13 and the negative side drive element Q23, and the connection point of the V phase coil 13$v$ and the W phase coil 13$w$ of the motor 13, and is in an open or close state by being under the control of the CPU 25. The motor relay 24 is for example, provided so as to shut off a circuit of the W phase in case an abnormality occurs in the W phase circuit only. In the present embodiment, to simplify explanations thereof, although an example of a case where the motor relay 24 shuts off the circuit of the W phase is provided, the motor relay 24 may shut off circuits of the other phases (U phase, W phase).

The CPU 25 controls the current being supplied to the motor 13 based off of the steering torque detected by the torque sensor 11, the speed detected by the vehicle speed sensor 12, and the currents Iu, Iv and Iw detected by the shunt resistors Ru, Rv, and Rw (the detected signal DS). Specifically, the CPU 25 obtains the current that needs to be supplied to the motor 13 in order to generate the needed steering assist torque, based off of the steering torque detected by the torque sensor 11, and the speed detected by the vehicle speed sensor 12.

The CPU 25 calculates a final output current from the variation between the currents Iu, Iv and Iw detected by the shunt resistors Ru, Rv and Rw (the detected signal DS), and the current obtained above. The CPU 25 converts the calculated final output current to a voltage, and outputs the control signal CS which controls the positive electrode side drive elements Q11, Q12, and Q13, and the negative electrode side drive elements Q21, Q22, and Q23 that are provided in the drive unit 23. As such, the CPU 25 conducts the so-called "feedback control" using the current.

When an abnormality occurs, the CPU 25 causes the power relay 22 to be in the closed state, and conducts control so that the current supplied from the battery BT to the motor 13 is shut off. Or, when an abnormality only occurs in the W phase, the CPU 25 conducts control that shuts off the W phase circuit and causes the motor relay 24 to be in an open state.

Along with the above mentioned control, the CPU 25 conducts overheat protection of parts out of the parts of the motor 13 and the control unit 14 that are disposed on the pathway which the current supplied to the motor 13 flows through. It is possible to mention the choke coil 21 of the control unit 14, the power relay 22, the positive electrode side drive elements Q11, Q12, and Q13, the negative electrode side drive elements Q21, Q22, and Q23, the smoothing capacitors C1, C2 and C3, the motor relay 24, and the U phase coil 13u, the V phase coil 13v, and the W phase coil 13w of the motor 13 as parts that need to have overheat protection conducted.

Parts that are not shown in FIG. 1, but that need to have overheat protection conducted include permanent magnets, wires, and terminals or the like that connect the wires or the like that are housed within the motor 13. Since materials of the shunt resistors Ru. Rv and Rw of the control unit 14 have more thermal resistivity than the parts mentioned above, the shunt resistors Ru, Rv and Rw shall be ignored. Similarly, the wires and the connection terminals are to be ignored.

Figure 2:
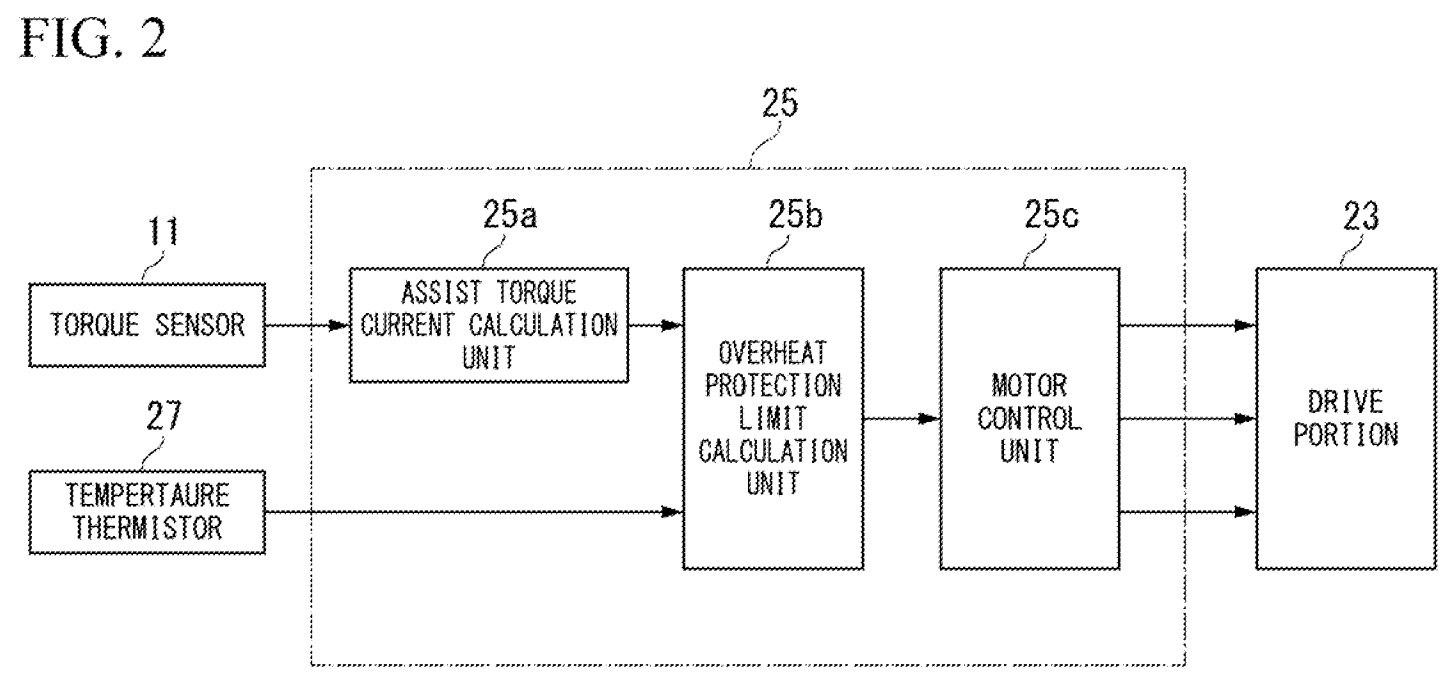

FIG. 2 is a block diagram that shows a configuration that relates to the overheat protection that the CPU conducts in the first embodiment. The same reference sings are affixed to configurations in FIG. 2 that are similar to configurations shown in FIG. 1. As shown in FIG. 2, as a configuration that relates to the overheat protection, the CPU 25 includes an assist torque current calculation unit 25a (first calculation unit), an overheat protection limit calculation unit 25b (second calculation unit) and a motor control unit 25c.

The assist torque current calculation unit 25a uses the steering torque detected by the torque sensor 11 to obtain the current that needs to be supplied to the motor 13 in order to generate the needed steering assist torque. The overheat protection limit calculation unit 25b conducts overheat protection of the parts that need to have overheat protection, based off of the current obtained from the assist torque current calculation unit 25a and the temperature detected by the temperature thermistor 27, while obtaining the current (limiting current) that is actually supplied to the motor 13 in order to generate steering assist torque.

The temperature thermistor 27 is attached to the heatsink 26, and detects a temperature of the heatsink 26. This is because the parts that need to have overheat protection conducted are attached in a vicinity of the heatsink 26, and the temperature of the heatsink 26 greatly affects an ambient temperature of the parts that need to have overheat protection conducted. Since a thermal time constant of the heatsink 26 is longer compared to a thermal time constant of the parts that need to have overheat protection conducted, and a heat capacity of the heatsink 26 is larger compared to a heat capacity of the parts that need to have overheat protection conducted, an effect that the temperature of the heatsink 26 has on the ambient temperature becomes large.

Specifically, the overheat protection limit calculation unit 25b maintains an overheat protection feature that is prepared in advance for each of the parts that need to have overheat protection conducted, and uses the maintained overheat protection feature to obtain the current (limiting current) that is actually supplied to the motor 13. The overheat protection feature mentioned above shows a relationship between how large the current is, and an overheat protection coefficient, where the current is regulated by taking into account the effects that a part out of a plurality of the parts that need to have overheat protection conducted has, and an effect that a heat generated by the other parts out of the plurality of the parts that need to have overheat protection conducted has on the ambient temperature mentioned above. A unit of the overheat protection coefficient is synonymous with a unit of a rate of current decline, [A/s].

The overheat protection limit calculation unit 25b obtains the overheat protection coefficient when the current obtained from the assist torque current calculation unit 25a flows through, using the overheat protection feature prepared for the parts that need to have overheat protection conducted. The overheat protection limit calculation unit 25b uses the obtained overheat protection coefficient to obtain the current that is actually supplied to the motor 13.

When a plurality of the parts that need to have overheat protection conducted exist, the overheat protection limit calculation unit 25b obtains overheat protection coefficients for each of the above parts when the current obtained from the assist torque current calculation unit 25a flows through. The overheat protection limit calculation unit 25b then uses the largest value out of the obtained overheat protection coefficients to obtain the current that is actually supplied to the motor 13. The above is done so that temperatures of all of the parts that need to have overheat protection conducted do not exceed a rated temperature (upper limit).

The motor control unit 25c generates the control signal CS which controls the positive electrode side drive elements Q11, Q12, and Q13 and the negative electrode side drive elements Q21, Q22, and Q23 that are provided in the drive unit 23 based off of the current obtained from the overheat protection limit calculation unit 25b. Specifically, the motor control unit 25c calculates a final output current from the variation between the current obtained from the overheat protection limit calculation unit 25b, and the currents Iu, Iv and Iw detected by the shunt resistors Ru, Rv and Rw (the detected signal DS). The motor control unit 25c converts the calculated final output current to a voltage, and outputs the control signal CS which controls the positive electrode side drive elements Q11, Q12, and Q13 and the negative electrode side drive elements Q21, Q22, and Q23 that are provided in the drive unit 23.

<Overheat Protection Feature>

Next, the overheat protection feature that is prepared for each of the parts that need to have overheat protection conducted mentioned above is explained. In general, when conducting the overheat protection of a part, there is a need to have a temperature of the part not exceed the rated temperature (upper limit) of the part thereof. A feature of the overheat protection with respect to the current of the part depends on a temperature rise of the part when power is being supplied.

In general, the temperature rise $\Delta T1$ [° C.] of a time "t" after part starts to generate heat is expressed by an equation (1) below. In the equation (1) below, "RW1" is a heat resistance [° C./W] of the part, "W1" is an amount of heat generation [W] of the part, and "$\tau 1$" is a time constant [s].

[Math 1]

$$\Delta T1 = RW1 \cdot W1 \cdot \left\{ 1 - \exp\left(-\frac{t}{\tau 1}\right)\right\} \tag{1}$$

The amount of the heat generation W1 is expressed using a resistance R1 [$\Omega$] of the part, and a current I1 [A] of the current that flows to the part, as in equation (2) below.

[Math 2]

$$W1 = R1 \cdot I1^2 \tag{2}$$

Substituting the equation (2) below in to the equation (1), the below equation (3) is obtained. In the equation (3) below, K1=RW1×R1.

[Math 3]

$$\Delta T1 = K1 \cdot I1^2 \cdot \left\{ 1 - \exp\left(-\frac{t}{\tau 1}\right)\right\} \tag{3}$$

When surrounding temperature of the part (ambient temperature) is assumed not to change from an initial surrounding temperature Ti [° C.], the part temperature T1 is expressed by equation (4) below.

[Math 4]

$$T1 = \Delta T1 + Ti \tag{4}$$

However, in reality, since the surrounding temperature of the parts changes due to heat dissipating from other parts, an actual part temperature T1 is expressed by equation (5) below.

[Math 5]

$$T1 = K1 \cdot I1^2 \cdot \left\{ 1 - \exp\left(-\frac{t}{\tau 1}\right)\right\} + K2 \cdot I2^2 \cdot \left\{ 1 - \exp\left(-\frac{t}{\tau 2}\right)\right\} + Ti \tag{5}$$

In the above equation (5), 12 is a current [A] that flows to the other parts, K2 is a heat resistance [° C./W] of surroundings of the part, and $\tau 2$ is a time constant [s] of the surroundings of the part. For example, if the surroundings of the part are air, K2 is the heat resistance of air, and $\tau 2$ is the time constant of air. As opposed to this, if the heatsink 26 is disposed in the surroundings of the part, K2 is the heat resistance of the heatsink, and $\tau 2$ is the time constant of the heatsink. In other words, the first term on the right hand side of the above equation (5) shows a rise in temperature due to self-generated heat of the part, and the second term of the right hand side shows a rise in temperature due to a rise in the ambient temperature as a result of heat generated by the other parts.

To simplify, an example is used to explain the rise in the temperature of parts. Attention is given to the drive elements (drive elements Q11 and Q21) that form the U phase series circuit out of drive elements (drive elements Q11, Q12, Q13, Q21, Q22, and Q23) of the drive unit 23 shown in FIG. 1.

The drive elements Q11, Q12, Q13, Q21, Q22, and Q23 are attached to the heatsink 26. For such reason, the temperature (ambient temperature) of the heatsink 26 does not only receive the effects of the drive elements (drive elements Q11 and Q21) that form the U phase series circuit, but also receives the effects of the drive elements (drive elements Q12, Q13, Q22, and Q23) that form the V phase and the W phase series circuits.

For now, the drive elements Q11, Q12, Q13, Q21, Q22, and Q23 all have the same specifications. When heat is being dissipated from the drive elements Q11, Q12, Q13, Q21, Q22, and Q23 to the heatsink 26, heat resistances thereof are the same. A heat distribution of the heatsink 26 is uniform. As such, it is possible to express a temperature $T_{fet\_u}$ of the drive elements (drive elements Q11 and Q21) that form the U phase series circuit with equation (6) shown below.

[Math 6]

$$T_{fet\_u} = K1 \cdot Iu^2 \cdot \left\{ 1 - \exp\left(-\frac{t}{\tau 1}\right)\right\} + K2 \cdot Iu^2 \cdot \left\{ 1 - \exp\left(-\frac{t}{\tau 2}\right)\right\} + \tag{6}$$

$$K2 \cdot Iv^2 \cdot \left\{ 1 - \exp\left(-\frac{t}{\tau 2}\right)\right\} + K2 \cdot Iw^2 \cdot \left\{ 1 - \exp\left(-\frac{t}{\tau 2}\right)\right\} + Ti$$

Iu in the above equation (6) is the current that flows through in the drive elements (drive elements Q11 and Q21) that form the U phase series circuit. Iv is the current that flows through in the drive elements (drive elements Q12 and Q22) that form the V phase series circuit. Iw is the current that flows through in the drive elements (drive elements Q13 and Q23) that form the W phase series circuit.

The first term on the right hand side in the above equation (6) shows a rise in temperature due to the self-generated heat of the drive elements (drive elements Q11 and Q21) that form the U phase series circuit. The second term on the right hand side shows a rise in the temperature of the heatsink 26 due to heat generation of the drive elements (drive elements Q11 and Q21) that form the U phase series circuit. The third term on the right hand side shows a rise in the temperature of the heatsink 26 due to heat generation of the drive elements (drive elements Q12 and Q22) that form the V phase series circuit. The fourth term on the right hand side shows a rise in the temperature of the heatsink 26 due to heat generation of the drive elements (drive elements Q13 and Q23) that from the W phase series circuit.

By combining the second to the fourth terms of the right hand side of the above equation (6), equation (7) below is obtained.

[Math 7]

$$T_{fet\_u} = K1 \cdot Iu^2 \cdot \left\{ 1 - \exp\left(-\frac{t}{\tau 1}\right)\right\} + \tag{7}$$

$$K2 \cdot \left(Iu^2 + Iv^2 + Iw^2\right) \cdot \left\{ 1 - \exp\left(-\frac{t}{\tau 2}\right)\right\} + Ti$$

Furthermore, the above equation (7) may be expressed by equation (8) or equation (9) below.

[Math 8]

$$T_{fet\_u} = K1 \cdot Iu^2 \cdot \left\{1 - \exp\left(-\frac{t}{\tau 1}\right)\right\} + K2 \cdot Im^2 \cdot \left\{1 - \exp\left(-\frac{t}{\tau 2}\right)\right\} + Ti \quad (8)$$

[Math 9]

$$T_{fet\_u} = K1 \cdot Iu^2 \cdot \left\{1 - \exp\left(-\frac{t}{\tau 1}\right)\right\} + K2 \cdot Km \cdot Iu^2 \cdot \left\{1 - \exp\left(-\frac{t}{\tau 2}\right)\right\} + Ti \quad (9)$$

Im in the above equation (8) is a motor current expressed in equation (10) below. Km in the above equation (9) is a constant.

[Math 10]

$$Im = \sqrt{Iu^2 + Iv^2 + Iw^2} \quad (10)$$

The first term in the right hand side of the above equations (8) and (9) shows a rise in temperature due to the self-generated heat of the drive elements (drive elements Q11 and Q21) that form the U phase series circuit. The second term in the right hand side shows a rise in temperature of the heatsink 26 due to heat generation of the drive elements Q11, Q12, Q13, Q21, Q22, and Q23.

Since the heat capacity of the heatsink 26 is larger than heat capacities of the drive elements Q11, Q12, Q13, Q21, Q22, and Q23, and the time constant is longer, then $\tau 1 < \tau 2$. It is possible then to split the rise in temperature of the drive elements (drive elements Q11 and Q21) that form the U phase series circuit to the rise in the self-generated heat of the drive elements (drive elements Q11 and Q21) that form the U phase series circuit, and to the rise in temperature of the heatsink 26. Since the rise in temperature of the heatsink 26 is dependent on the heat generation of all the drive elements Q11, Q12, Q13, Q21, Q22, and Q23, then $K1 < K2 \times Km$.

From the above, when the current Iu which flows through the drive elements (drive elements Q11 and Q21) that form the U phase series circuit is large, the rise in the temperature due to the self-generated heat (first term on the right hand side of the equation (9)) has a tendency to become dominant in the $T_{fet\_u}$ temperature of the drive elements (drive elements Q11 and Q21). Conversely, when the current Iu is small, the ambient temperature (temperature of the heatsink 26) (second term on the right hand side of the equation (9)) has a tendency to become dominant in the $T_{fet\_u}$ temperature of the drive elements (drive elements Q11 and Q21).

Below, the overheat protection feature of the parts that need to have overheat protection conducted is explained. Specifically, the overheat protection feature of the drive elements (MOSFET), motor coils (U phase coil 13u, V phase coil 13v, and W phase coil 13w), the power relay 22 and the motor relay 24, capacitors (the smoothing capacitors C1, C2 and C3), the choke coil 21, and the permanent magnets used in the motor 13 is considered in such order.

<<Overheat Protection Feature of the Drive Elements>>

Figure 3A:
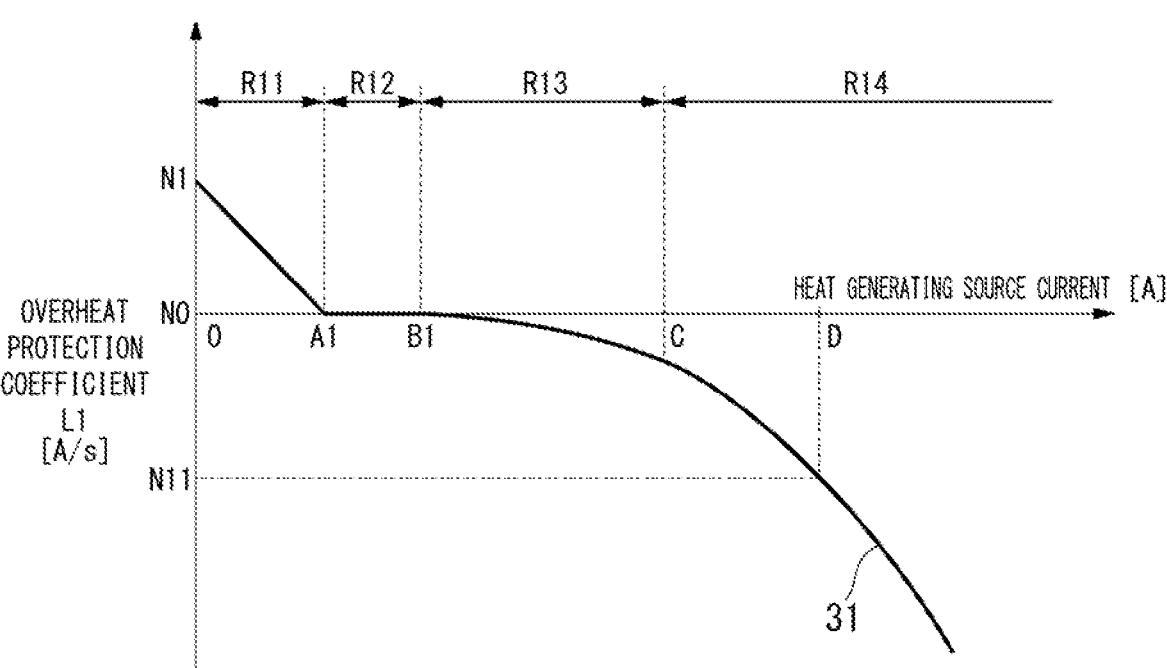
FIG. 3A A view that shows an example of an overheat protection feature of a driving element (MOSFET) in the first embodiment.

FIG. 3A is a view that shows an example of the overheat protection feature of the driving element (MOSFET) in the first embodiment. The horizontal axis of the graph shown in FIG. 3A is a heat generating source current [A], and the vertical axis is an overheat protection coefficient L1 [A/s]. An overheat protection feature 31 of the drive elements shown in FIG. 3A is a value that is obtained by estimating the overheat protection coefficient L1 of a current of each heat generating source, such that the temperature of the drive elements does not exceed a rated (upper limit) temperature, where equation (9) above is used to obtain a degree of change of the $T_{fet\_u}$ temperature of the drive elements when the current Iu flows through.

The overheat protection feature 31 of the drive elements shown in FIG. 3A is split into four regions R11 to R14 according to how large the current of the heat generating source is. A region R11 is a region (0 to A1) where the current of the heat generating source is extremely small. In the region R11, the overheat protection coefficient L1 increases linearly as the current of the heat generating source becomes less. For example, the overheat protection coefficient L1 is N1 when the current of the heat generating source is zero, and the overheat protection coefficient L1 is N0 when the current of the heat generating source is A1. A region R12 is an intermediate region (A1 to B1) of the current of the heat generating source. The overheat protection coefficient L1 becomes a constant (N0) in the region R12 so as to balance the heat dissipation of the heat generation of the drive elements and the heatsink 26 or the like.

A region R13 is a region (B1 to C) where the current of the heat generating source is large. In the region R13, the overheat protection coefficient L1 gradually decreases according to a change in the current of the heat generating source. A region R14 is a region (larger than C) where the current of the heat generating source is extremely large. In the region R14, the overheat protection coefficient L1 suddenly decreases according to a change in the current of the heat generating source. The region R13 is a region where the ambient temperature (the temperature of the heatsink 26) (second term of the right hand side of the equation (9)) is dominant. The region R14 is a region where the rise in temperature (first term of the right hand side of equation (9)) due to the self-generated heat of the drive elements dominates. Both regions R13 and R14 are regions that need overheat protection of the drive elements.

When the current that flows to the driving element is less than or equal to B1, the overheat protection of the driving element is not needed. As such, when the current obtained from the assist torque current calculation unit 25a of the CPU 25 is less than or equal to B1 mentioned above, the overheat protection limit calculation unit 25b actually supplies the current obtained from the assist torque current calculation unit 25a to the motor 13.

Conversely, when the current that flows to the driving element is larger than B1, the driving element needs overheat protection. As such, when the current obtained from the assist torque current calculation unit 25a of the CPU 25 is larger than B1 mentioned above, the overheat protection limit calculation unit 25b obtains the overheat protection coefficient L1 according to the current obtained from the assist torque current calculation unit 25a using the overheat protection feature 31 shown in FIG. 3A.

When the current that is obtained from the assist torque current calculation unit 25a is D in the middle of FIG. 3A, the overheat protection limit calculation unit 25b obtains N11 as the overheat protection coefficient L1. The overheat protection limit calculation unit 25b conducts current control by reducing the current obtained from the assist torque current calculation unit 25a by N11 for every second.

For example, a case where B1 in the middle of FIG. 3A is 20 [A] and D is 50 [A], and N11 is 3 [A/s] is considered. In such case, the overheat protection limit calculation unit 25*b* reduces the current (50 [A]) obtained from the assist torque current calculation unit 25*a* by a factor of 3 [A] for every second. Since the current reaches 20 [A] (B1 in the middle of FIG. 3A) after 10 seconds, the overheat protection limit calculation unit 25*b* momentarily stops current control.

The overheat protection feature 31 (the overheat protection coefficient L1 increases linearly, as the current of the heat generating source becomes less) in the region R11 is provided so as to return a current limit value to an initial value, when an operator finishes steering wheel operation, taking into account the heat dissipation thereof. The initial value of the current limit value for example, is set to 1.5 times a maximum value (rated current) of a current amount needed to assist steering.

<<Overheat Protection Feature of the Motor Coil>>

Next, an overheat protection feature of the motor coils (U phase coil 13*u*, V phase coil 13*v*, and W phase coil 13*w*) is considered. For the temperature of the motor coils, when the current that flows through is large, the self-generated heat of the motor coils becomes dominant, and when the current that flows through is small, the ambient temperature becomes dominant. As such, the overheat protection feature of the motor coils becomes the same as the overheat protection feature 31 of the drive elements shown in FIG. 3A. However, each value (A1, B1, C, N1) of the overheat protection feature and a reduction curve is different than each value and the reduction curve of the drive elements.

<<Overheat Protection Feature of the Power Relay and the Motor Relay>>

Next, overheat protection features of the power relay 22, and the motor relay 24 are considered. If the above relays have mechanisms of mechanical switches, because no electrical potential difference arises within the mechanism of the switch, it is possible to ignore the overheat protection. However, if an electrical relay such as an FET, an IGBT (Insulated Gate Bipolar Transistor) or the like is used, it is possible to use the same overheat protection feature 31 of the drive elements shown in FIG. 3A.

<<Overheat Protection Feature of the Capacitors>>

Figure 3B:
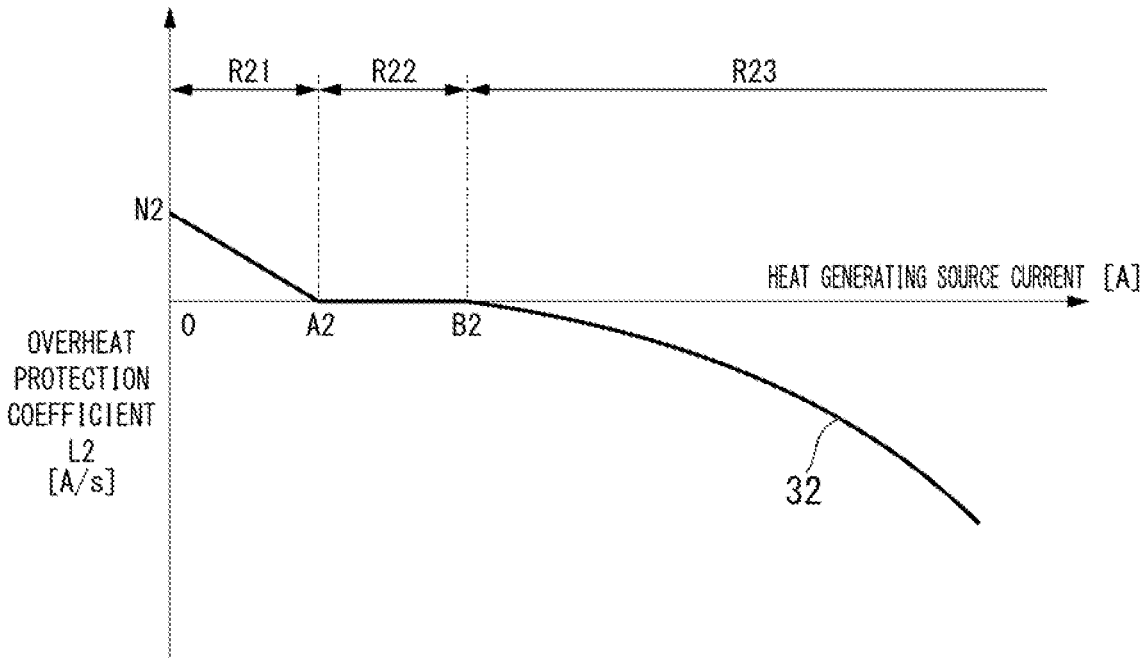
FIG. 3B A view that shows an example of the overheat protection feature of a capacitor in the first embodiment.

FIG. 3B is a view that shows an example of an overheat protection feature of the capacitor in the first embodiment. The horizontal axis of the graph shown in FIG. 3B is a heat generating source current (the current flowing through the capacitor) [A], and the vertical axis is an overheat protection coefficient L2 [A/s]. An overheat protection feature 32 of the capacitors (the smoothing capacitors C1, C2 and C3) is split into three regions R21 to R23 according to how large the current of the heat generating source is. A region R21 is a region (0 to A2) where the current of the heat generating source is extremely small. A region R22 is an intermediate region (A2 to B2) of the current of the heat generating source. A region R23 is a region where the current of the heat generating source is large (larger than B2).

The smoothing capacitors C1, C2, and C3 are disposed in the vicinity of the drive elements Q11, Q12, Q13, Q21, Q22, and Q23 to remove any ripples that are generated by the switching of the drive elements Q11, Q12, Q13, Q21, Q22, and Q23. For such reason, temperatures of the smoothing capacitors C1, C2, and C3 are dominated by temperatures of the drive elements Q11, Q12, Q13, Q21, Q22, Q23, and the temperature of the heatsink 26, and are especially the same extent as the temperature of the heatsink 26.

Therefore, the temperatures of the smoothing capacitors C1, C2, and C3 are dominated by the ambient temperature (the second term of equation (5)) regardless of how large the current that flows through is, and the overheat protection feature of the smoothing capacitors C1, C2, and C3 is as the overheat protection feature 32 shown in FIG. 3B. The overheat protection feature 32 in the region R23 is shown by a quadratic curve. It is possible for the current of the heat generating source to use a current (current that flows to the drive elements) within the same phase.

<<Overheat Protection Feature of the Choke Coil>>

Figure 3C:
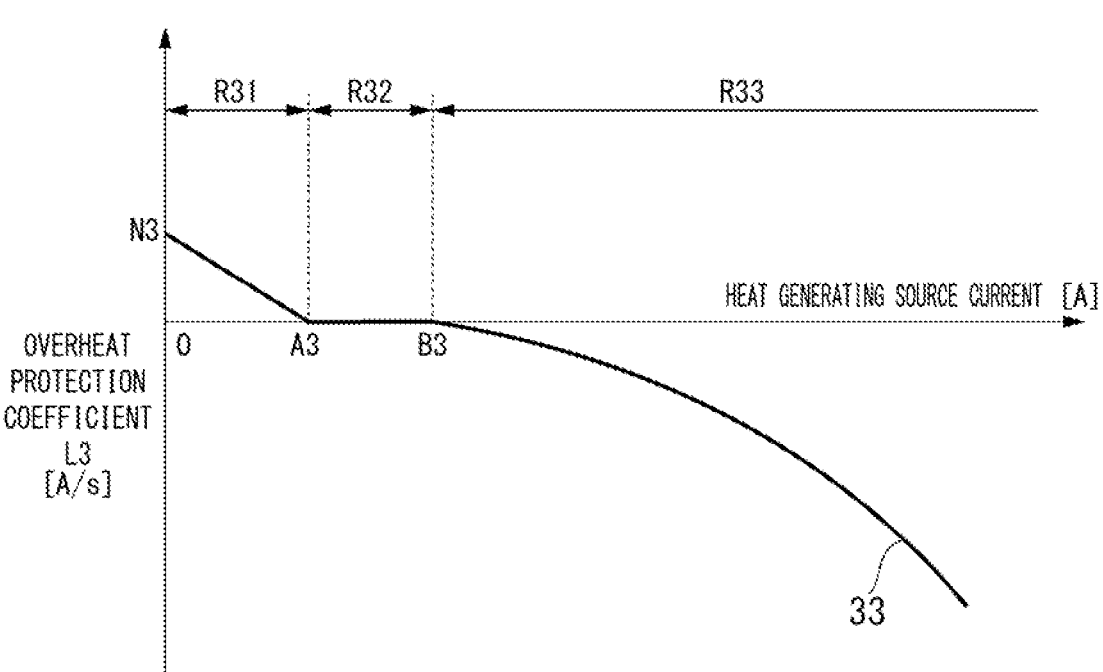
FIG. 3C A view that shows an example of the overheat protection feature of a choke coil in the first embodiment.

FIG. 3C is a view that shows an example of the overheat protection feature of the choke coil in the first embodiment. The horizontal axis of the graph shown in FIG. 3C is a heat generating source current (the current flowing through the choke coil) [A], and the vertical axis is an overheat protection coefficient L3 [A/s]. An overheat protection feature 33 of the choke coil 21 is split into three regions R31 to R33 according to how large the current of the heat generating source is. A region R31 is a region (0 to A3) where the current of the heat generating source is extremely small. A region R32 is an intermediate region (A3 to B3) of the current of the heat generating source. A region R33 is a region where the current of the heat generating source is large (larger than B3).

Although the temperature of the choke coil 21 is not the same level as the temperature of the smoothing capacitors C1, C2 and C3, the temperature of the choke coil 21 is dominated by the temperature of the heatsink 26. As such, the overheat protection feature 33 of the choke coil 21 shown in FIG. 3C is the same as the overheat protection feature 32 shown in FIG. 3B. When the choke coil 21 is disposed in a location far from the drive elements and the motor coil, the temperature of the choke coil 21 is dependent not on the current that flows to the choke coil, but on all of the currents that flow to the various subsequent parts. In other words, the temperature of the choke coil 21 is dependent on a phase current that is controlled by the control signal CS which is output from the CPU 25.

<<Overheat Protection Feature of the Permanent Magnets Used in the Motor>>

Next, an overheat protection feature of the permanent magnets (abbreviated from drawings) used in the motor 13 is considered. Since the permanent magnets do not have self-generated heat, a temperature of the permanent magnets is determined by the surrounding temperature. As with the choke coil 21, the current flowing to the motor 13 is also dependent on the phase current. As such, the overheat protection feature of the permanent magnets used in the motor 13 are the same as the overheat protection feature 33 shown in FIG. 3C.

However, the various values (A3, B3, N2) and a quadratic curve in the overheat protection feature of the permanent magnets used in the motor 13 may be different than the values and the quadratic curve in the choke coil 21. Since the permanent magnets are disposed in the vicinity of high heat generating motor coils, there are cases where the overheat protection feature of the permanent magnets may depend on various phase currents. In a case where the temperature is evenly distributed over an entirety of the motor 13, it is possible for the overheat protection feature of the permanent magnets to be dependent on all the currents that flows through the motor 13. As such, as the overheat protection features of the permanent magnets used in the motor 13, it is possible to retain two types of overheat protection features: an overheat protection feature that depends on the various phase currents, and an overheat protection feature that depends on the all of the currents.

As mentioned above, in the first embodiment, the assist torque current calculation unit 25*a* obtains the current that needs to be supplied to the motor 13 to generate the required steering assist torque. The overheat protection limit calculation unit 25b uses the overheat protection feature that is prepared in advance for each of the parts that need to have overheat protection conducted, to obtain the overheat protection coefficient when the current obtained from the assist torque current calculation unit 25a flows through, and limits the current that flows to the motor 13. The above overheat protection feature shows a relationship between how large the current is, and the overheat protection coefficient, where the current is regulated by taking into account an effect that the heat generation of a part out of a plurality of parts that need overheat protection has on the ambient temperature, and the effect that the other parts of the plurality of parts that need overheat protection have on the ambient temperature.

As such, in the present embodiment, the current that flows to the motor 13 is limited by obtaining the overheat protection coefficient, using an overheat protection feature that is regulated by taking into account the actual ambient temperature or an estimated temperature that is close to the ambient temperature. As such, in the present embodiment, it is possible to prevent a decrease in steering assist while conducting a suitable countermeasure for heat dissipation.

Also, in the present embodiment, in a case where a plurality of parts that need overheat protection exist, the overheat protection limit calculation unit 25b obtains the overheat protection coefficients from the assist torque current calculation unit 25a for the various parts. The largest value out of the above overheat protection coefficients is used to obtain the actual current that is supplied to the motor 13. Thus, continuity of the control is ensured, and it is possible to effectively add steering force assist.

Second Embodiment

A configuration of an electric power steering device according to the present embodiment is about the same as the electric power steering device 1 shown in FIG. 1. However, the present embodiment differs from the first embodiment in an aspect of having a plurality of types of overheat protection features which are used by the overheat protection limit calculation unit 25b be prepared according a rotation state of the motor 13.

Specifically, in the present embodiment, the overheat protection limit calculation unit 25b retains an overheat protection feature (a first overheat protection feature) when the motor 13 is stopped, and a case where the overheat protection feature (a second overheat protection feature) when the motor 13 is rotating. The overheat protection limit calculation unit 25b obtains an overheat protection coefficient when the current obtained from the assist torque current calculation unit 25a flows through, according to whether the motor 13 is stopped or not, using the overheat protection feature of the former or the overheat protection feature of the latter.

The equation (9) explained in the first embodiment is an equation when the motor 13 is stopped at a certain angle. When the motor 13 is stopped, the phase that the motor 13 is stopped at is concentrated on, and the current flows. Conversely, when the motor 13 is rotating, no single phase is concentrated on, and the current flows equally and so on to the various phases.

As such, according to whether the motor 13 is rotating or is stopped, there is a need to reread the constant Km of the second term of the previously mentioned equation (9) as Km1 and Km2 below.

when the motor 13 is stopped:

$$Km1 = \left(1/\sqrt{(2)}\right)$$

when the motor 13 is rotating:

$$Km2 = \left(1/\sqrt{(2)}\right)*\left(2/\pi\right)$$

Figure 4A:
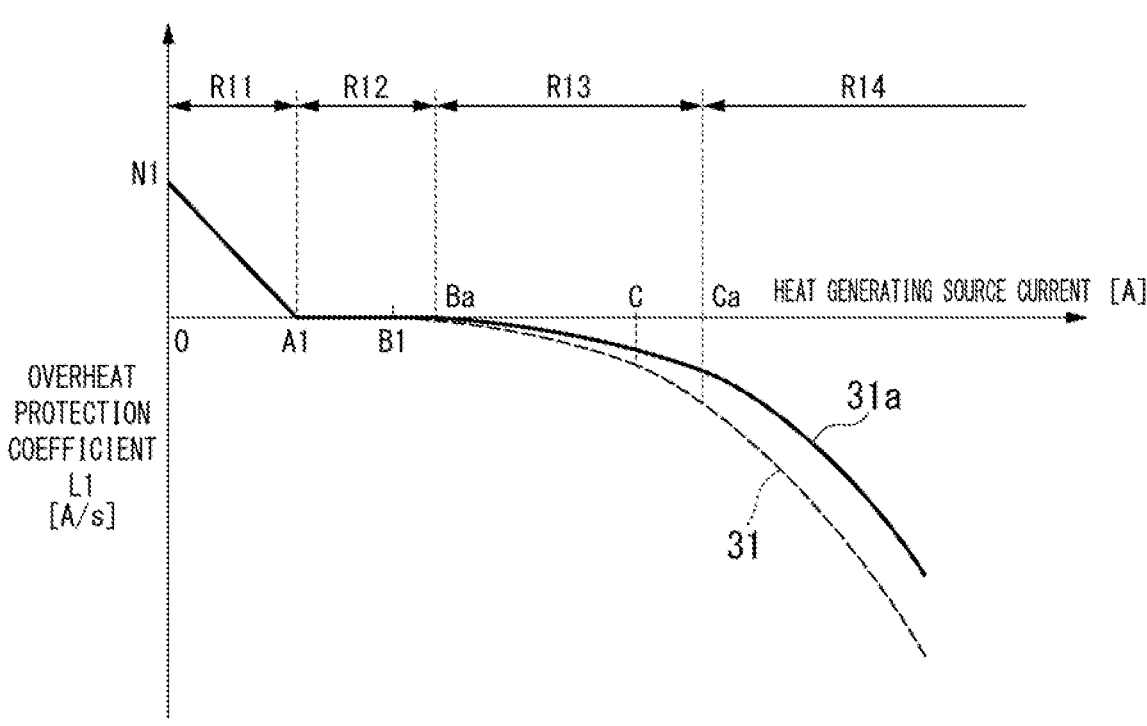
FIG. 4A A view that shows an example of an overheat protection feature of the driving element (MOSFET) in a second embodiment.

FIG. 4A is a view that shows an example of the overheat protection feature of the driving element (MOSFET) in a second embodiment. The graph shown in FIG. 4A is similar to the graph shown in FIG. 3A, where the horizontal axis is heat generating source current (the current that flows through the drive elements) [A], and the vertical axis is an overheat protection coefficient L1 [A/s]. An overheat protection feature 31a shown in FIG. 4A is the overheat protection feature of the drive elements when the motor 13 is rotating. The overheat protection feature 31 is the overheat protection feature of the drive elements when the motor 13 is stopped. The overheat protection feature 31 shown in FIG. 4A is the same as the overheat protection feature 31 shown in FIG. 3A.

As shown in FIG. 4A, it can be understood that the overheat protection feature 31a of the drive elements when the motor 13 is rotating shows smoother change as compared to the overheat protection feature 31 of the drive elements when the motor 13 is stopped. This is because a rise in the temperature of the drive elements is small. In other words, when the motor 13 is rotating, as compared to when the motor 13 is stopped, for example, even if a rise in temperature due to self-generated heat of drive elements (for example, drive elements Q11, Q21) is roughly the same, since the current that flows to the other drive elements (for example drive elements Q12, Q13, Q22, and Q23) becomes less, and the rise in temperature due to the drive elements (for example, drive elements Q11, Q21) becomes less.

As shown in the example of FIG. 4A, an upper limit value (lower limit value of the region R13) of the region R12 changes from B1 to Ba. An upper limit value (lower limit value of the region R14) of the region R13 changes from C to Ca.

Figure 4B:
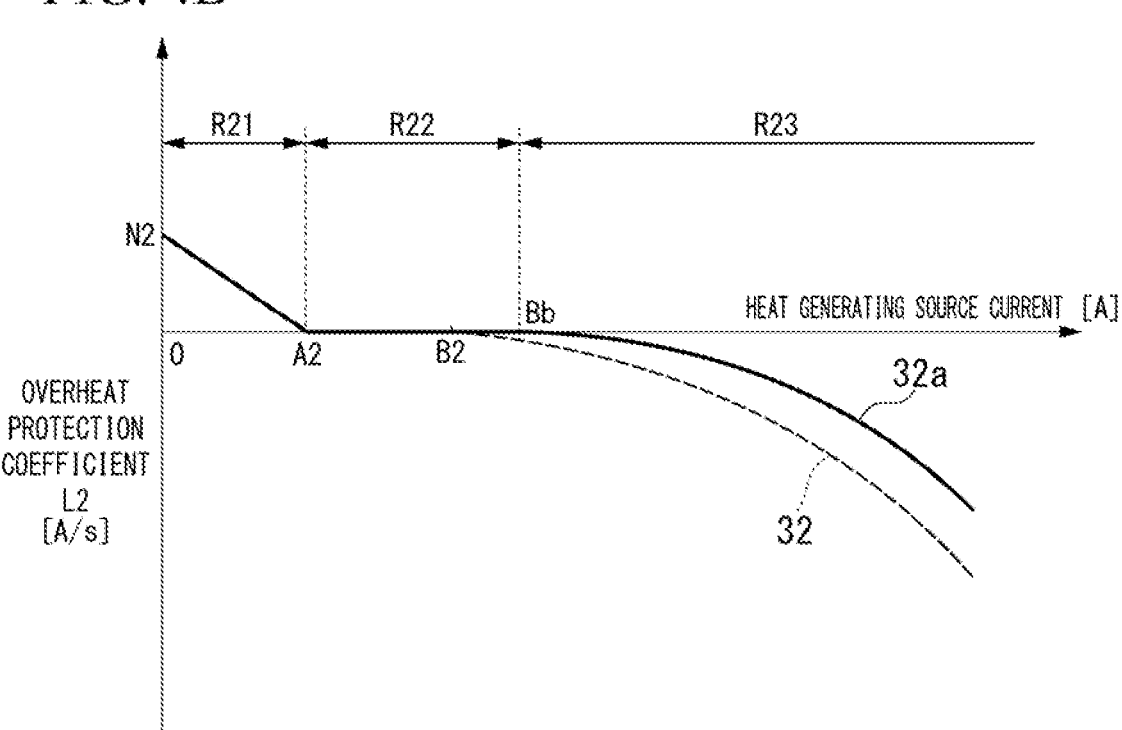
FIG. 4B A view that shows an example of the overheat protection feature of a capacitor in the second embodiment.

FIG. 4B is a view that shows an example of the overheat protection feature of a capacitor in the second embodiment. The graph shown in FIG. 4B is similar to the graph shown in FIG. 3B, where the horizontal axis is heat generating source current (the current that flows through the capacitor) [A], and the vertical axis is an overheat protection coefficient L2 [A/s]. An overheat protection feature 32a shown in FIG. 4B is the overheat protection feature of the capacitor when the motor 13 is rotating. The overheat protection feature 32 is the overheat protection feature of the capacitor when the motor 13 is stopped. The overheat protection feature 32 shown in FIG. 4B is the same as the overheat protection feature 32 shown in FIG. 3B.

As shown in FIG. 4B, it can be understood that the overheat protection feature 32a of the capacitor when the motor 13 is rotating shows smoother change as compared to the overheat protection feature 32 of the capacitor when the motor 13 is stopped. This is due to the same reason as that of the case of FIG. 4A explained earlier. In the example shown in FIG. 4B, an upper limit value of a region 22 (a lower limit value of a region 23) changes from B2 to Bb.

Figure 4C:
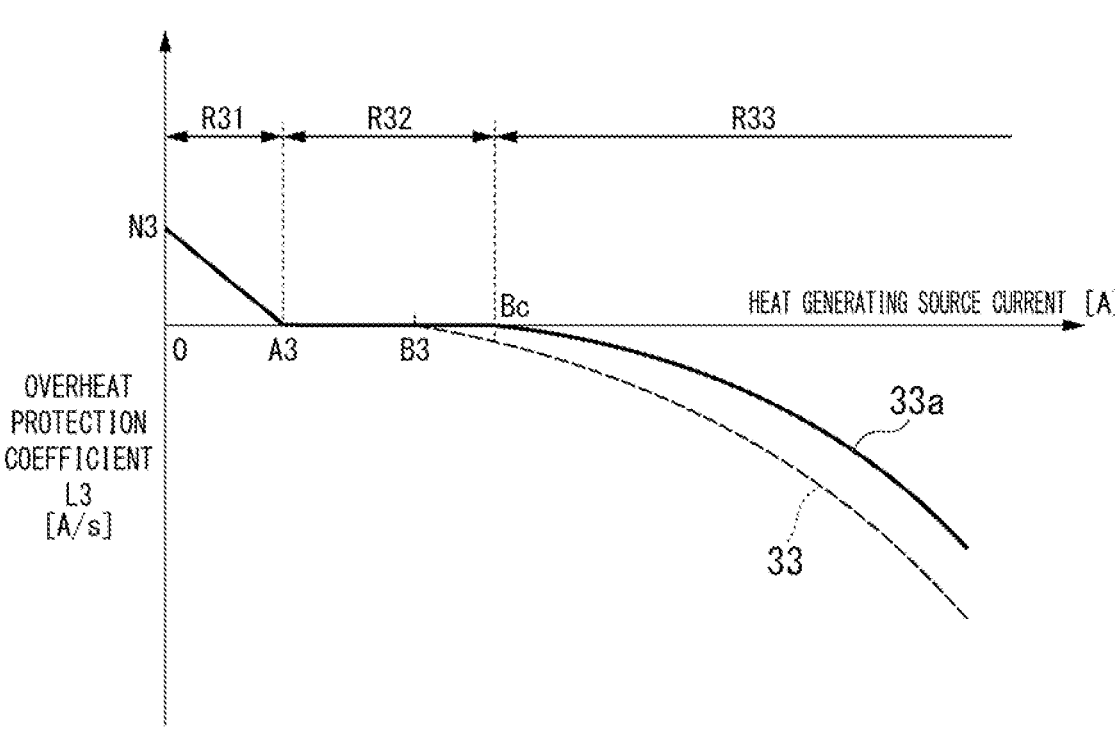
FIG. 4C A view that shows an example of the overheat protection feature of a choke coil in the second embodiment.

FIG. 4C is a view that shows an example of the overheat protection feature of a choke coil in the second embodiment. The graph shown in FIG. 4C is similar to the graph shown in FIG. 3C, where the horizontal axis is heat generating source current (the current that flows through the choke coil) [A], and the vertical axis is an overheat protection coefficient L3 [A/s]. An overheat protection feature 33a shown in FIG. 4C is the overheat protection feature of the choke coil when the motor 13 is rotating. The overheat protection feature 33 is the overheat protection feature of the choke coil when the motor 13 is stopped. The overheat protection feature 33 shown in FIG. 4C is the same as the overheat protection feature 33 shown in FIG. 3C.

As shown in FIG. 4C, it can be understood that the overheat protection feature 33a of the choke coil when the motor 13 is rotating shows smoother change as compared to the overheat protection feature 33 of the choke coil when the motor 13 is stopped. This is due to the same reason as that of the case of FIG. 4A explained earlier. In the example shown in FIG. 4C, an upper limit value of a region 32 (a lower limit value of a region 33) changes from B3 to Bc.

Regarding parts that have a small amount of self-generated heat, such as the choke coil 21, the capacitors (the smoothing capacitors C1 to C3), and the permanent magnets, when thermal effects of the parts that have a large amount of self-generated heat exist, the overheat protection feature 32a is often used when the motor 13 shown in FIG. 4B is rotating. Conversely, regarding the parts that have a large amount of self-generated heat, overheat protection features may be determined by dispositions of the parts within the device, and a situation of heat distribution, since there is no need to differentiate between when the motor 13 is rotating, and when the motor 13 is stopped.

As the above, the overheat protection feature of when the motor 13 is stopped and the overheat protection feature when the motor 13 is running is prepared in the overheat protection limit calculation unit 25b. The overheat protection coefficient when the current obtained from the assist torque current calculation unit 25a flows through is obtained according to whether the motor 13 is stopped or not, using the overheat protection feature of the former or the overheat protection feature of the latter. As such, it is possible to implement a more detailed countermeasure for overheat protection compared to the first embodiment, and it possible to more suitably set the overheat protection.

Although the above is an explanation of a present embodiment in the present disclosure, the present disclosure is not limited to the aforementioned explanation of present embodiment, and it is possible to adopt the configurations and methods below. For example, in the embodiment mentioned above, although the overheat protection feature of parts that need to have overheat protection conducted is shown using an equation, the overheat connection feature may be saved within the CPU 25 as a map or as a table.

In the embodiment mentioned above, although a case where the motor 13 is a three phase brushless motor is mentioned as an example, the motor 13 is not limited to a three phase brushless motor. For example, the motor 13 may be a brushed motor, or may be a motor having four or more phases.

In the embodiment mentioned above, as the parts that need to have overheat protection conducted and that at are disposed on a pathway in which the current supplied to the motor 13 flows through, the choke coil 21 of the control unit 14, the power relay 22, positive side drive elements Q11, Q12 and Q13, and negative side drive elements Q21, Q22 and Q23, the smoothing capacitors C1, C2 and C3, the motor relay 24, and the U phase coil 13u, the V phase coil 13v, and the W phase coil 13W of the motor 13 are mentioned.

However, the parts that need to have overheat protection conducted may include other parts than the aforementioned.

In the embodiment mentioned above, the temperature of the heatsink 26 to which the positive side drive elements Q11, Q12 and Q13, and negative side drive elements Q21, Q22 and Q23 are attached to is made to be the ambient temperature. However, a temperature other than the temperature of the heatsink 26 may be thought of as the ambient temperature. For example, in a case where the parts that need overheat protection are housed inside of a housing, a temperature of the housing may be the ambient temperature. In other words, in a case where the parts that need overheat protection are mounted on a substrate, a temperature of the substrate may be the ambient temperature.

In the embodiment mentioned above, an example where overheat protection is conducted on parts that are provided in the electric power steering device 1 is explained. However, the present disclosure is not limited to having overheat protection only be conducted on parts provided in the electric power steering device 1, and when overheat protection on parts that need to have overheat protection conducted and that are disposed on the pathway which the current being supplied to a motor flows through, it is possible to do so.

Each configuration included in the control unit 14 and in the electric power steering device 1 which act as the above mentioned motor control device have a computer system within. A program which realizes functions of each configuration that the above mentioned control unit 14 and the electric power steering device 1 includes is recorded on a computer read/write storage medium. The program recorded on the storage medium is loaded onto the computer system, and processing of each configuration included in the above mentioned control unit 14 and the electric power steering device 1 may be conducted. The part about "The program recorded on the storage medium is loaded onto the computer system . . . conducted" includes a case where the program is installed onto the computer system. What is referred to as "computer system" includes an OS and hardware of surrounding auxiliary devices or the like.

The "computer system" may also include a plurality of computer devices connected via a network that includes a communication line of an internet, WAN, LAN, a dedicated line or the like. The "computer read/write storage medium" refers to a portable medium such as a flexible disk, a magnetic optical disk, a ROM, a CD-ROM or the like, or a storage device such as a hard disk or the like that is built-into the computer system. As mentioned above, the storage medium which stores the program may be a non-transient storage medium such as a CD-ROM or the like.

A storage medium that is provided on an inside or an outside, and that is accessible from a distribution server so as to distribute the aforementioned program is included in the previously mentioned storage medium. The program may be a configuration where the program is split into a plurality of parts, and after each part is downloaded at a different time, each of the configurations included in the control unit 14 and in the electric power steering device 1 are combined. Different distribution servers may also distribute a part of the split program. The "computer read/write storage medium" may include a computer system built-in volatile memory (RAM) that temporarily retains the program, in a case of a server or a client computer system where the program is sent via a network. The above mentioned program may be a program that realizes a portion of the aforementioned functions. The program may realize the aforementioned functions by combining with a program that is already installed on the computer system, or may be a delta file (delta program).

REFERENCE SIGN LIST

1 . . . Electric Power Steering Device, 11 . . . Torque Sensor, 13 . . . Motor, 13u . . . U Phase Coil, 13v . . . V Phase Coil, 13w . . . W Phase Coil, 14 . . . Control Unit, 21 . . . Choke Coil, 22 . . . Power Relay, 24 . . . Motor Relay, 25a . . . Assist Torque Current Calculation Unit, 25b . . . Overheat Protection Limit Calculation Unit, 31~33 . . . Overheat Protection Features, 31a~33a . . . Overheat Protection Features, C1~C3 . . . Smoothing Capacitors, Q11~Q13 . . . Drive Elements, Q21~Q23 . . . Drive Elements

The invention claimed is:

1. A motor control device comprising:
a first calculation unit that obtains a current that needs to be supplied to a motor, and
a second calculation unit that
    obtains an overheat protection coefficient when current obtained from the first calculation unit flows through using an overheat protection feature, and
    obtains a current that is actually supplied to the motor using the obtained overheat protection coefficient, wherein
the overheat protection feature:
    shows a relationship between how large the current is, and the overheat protection coefficient, where the current is regulated by taking into account an effect that heat generated by a part out of a plurality of parts disposed on a pathway which the current that is supplied to the motor flows through has on an ambient temperature, and an effect that heat generated by other parts out of the plurality of parts has on the ambient temperature, and
the second calculation unit
    retains:
    a first overheat protection feature that is the overheat protection feature in a case where the motor is stopped, and
    a second overheat protection feature different from the first overheat protection feature, that is the overheat protection feature in a case where the motor is rotating, and obtains the overheat protection coefficient when a current obtained from the first calculation unit flows through, whether the motor is rotating or is stopped, using the first overheat protection feature or the second overheat protection feature.

2. The motor control device according to claim 1, wherein:
the second calculation unit:
    retains the overheat protection feature for each of the plurality of parts,
    obtains the overheat protection coefficient for each of the parts when the current obtained from the first calculation unit flows through, and
    obtains a current that is actually supplied to the motor by using a largest value out of the obtained overheat protection coefficient.

3. The motor control device according to claim 1, wherein:
at least one of the plurality of parts is attached to a heatsink, and
the ambient temperature is a temperature of the heatsink.

4. The motor control device according to claim 1, wherein:
the plurality of parts are housed inside of a housing, and
the ambient temperature is a temperature of the housing.

5. The motor control device according to claim 1, wherein:
the plurality of parts are mounted on a substrate, and
the ambient temperature is a temperature of the substrate.

6. The motor control device according to claim 1, further comprising:
a drive unit that supplies the current obtained from the second calculation unit to the motor, wherein
one of the plurality of parts is a drive element provided in the drive unit.

7. An electric power steering device comprising:
a torque sensor that detects a steering torque of steering,
the motor which generates steering assist torque with respect to the steering, and
the motor control device according to claim 1 that controls a drive of the motor according to steering torque detected by the torque sensor.

* * * * *